United States Patent [19]

Yamamoto et al.

[11] 4,081,790
[45] Mar. 28, 1978

[54] CODE CONVERTER

[75] Inventors: Masami Yamamoto, Matsudo; Fumiaki Yamazaki, Tokyo; Akira Hosoda, Yokohama; Hiromi Hashimoto; Yoichi Tan, both of Tokyo, all of Japan

[73] Assignees: Nippon Telegraph and Telephone Public Corporation; Nippon Electric Co., Ltd., both of Tokyo, Japan

[21] Appl. No.: 730,118

[22] Filed: Oct. 6, 1976

[30] Foreign Application Priority Data

Oct. 6, 1975 Japan .................... 50-120968

[51] Int. Cl.² ............................................. G08C 25/00
[52] U.S. Cl. .................. 340/146.1 BE; 340/146.1 AB
[58] Field of Search ............ 340/146.1 AB, 146.1 BE, 340/347 DD; 325/41

[56] References Cited
U.S. PATENT DOCUMENTS

| | | | |
|---|---|---|---|
| 3,409,875 | 11/1968 | DeJager et al. | 340/146.1 BE |
| 3,652,988 | 3/1972 | Yamamoto et al. | 340/146.1 AB |
| 3,781,795 | 12/1973 | Zegers | 340/146.1 BE |

Primary Examiner—Charles E. Atkinson
Attorney, Agent, or Firm—Sughrue, Rothwell, Mion, Zinn and Macpeak

[57] ABSTRACT

A code converter circuit in a digital transmission system in which two mutually-synchronized digital signals are transmitted through a pair of transmission paths is disclosed. The transmission paths are characterized by the possibility of the terminal-to-terminal correspondence between input and output sides of the transmission paths being reversed. The code converter circuit includes an encoder on the input side of the transmission paths and a decoder on the output side of the transmission paths. The encoder comprises a modulo-2 adder and a switching circuit for selectively switching the input digital signals or the adder output signals to the transmission paths. The decoder comprises a modulo-2 subtractor and a switching circuit for selectively switching the digital signals from the transmission paths or the subtractor output signals to reproduce the transmitted digital signals.

8 Claims, 6 Drawing Figures

TABLE 1

| A-IN $S_A$ | B-IN $S_B$ |  | A-OUT $S_A$ | B-OUT $S_B$ |
|---|---|---|---|---|
| 0 | 0 | → | 0 | 0 |
| 0 | 1 | → | 0 | 1 |
| 1 | 0 | → | 1 | 0 |
| 1 | 1 | → | 1 | 1 |

TIME ↓

TABLE 2

| A-IN $S_A$ | B-IN $S_B$ |  | A-OUT $S_B$ | B-OUT $S_A$ |
|---|---|---|---|---|
| 0 | 0 | → | 0 | 0 |
| 0 | 1 | → | 1 | 0 |
| 1 | 0 | → | 0 | 1 |
| 1 | 1 | → | 1 | 1 |

TIME ↓

TABLE 3

| | | | | INITIAL VALUE | | | | | | | | | | |
|---|---|---|---|---|---|---|---|---|---|---|---|---|---|---|
| | TIME (t) | | | 0 | 1 | 2 | 3 | 4 | 5 | 6 | 7 | 8 | 9 | 10 |
| ENCODER | INPUT | A-IN | $S_A$ | | 0 | 1 | 1 | 0 | 1 | 1 | 1 | 0 | 0 | 1 |
| | | B-IN | $S_B$ | | 0 | 0 | 1 | 1 | 1 | 0 | 0 | 1 | 0 | 1 |
| | ADDER CIRCUIT | INPUT | $S_i$ | 0 | ↓ | 1 | ↓ | 0 | ↓ | 1 | 1 | 0 | ↓ | ↓ |
| | | OUTPUT | $U_i$ | 0 | ↓ | 1 | ↓ | 1 | ↓ | 0 | 1 | 1 | ↓ | ↓ |
| | OUTPUT | P | $S_P$ | | 0 | 1 | 1 | 1 | 1 | 0 | 1 | 1 | 0 | 1 |
| | | Q | $S_Q$ | | 0 | 0 | 1 | 0 | 1 | 1 | 0 | 0 | 0 | 1 |
| TRANSMISSION PATHS (DIRECT CONNECTION) | | | | | ↓ | ↓ | ↓ | ↓ | ↓ | ↓ | ↓ | ↓ | ↓ | ↓ |
| DECODER | INPUT | P' | $S_{P'}$ | | 0 | 1 | 1 | 1 | 1 | 0 | 1 | 1 | 0 | 1 |
| | | Q' | $S_{Q'}$ | | 0 | 0 | 1 | 0 | 1 | 1 | 0 | 0 | 0 | 1 |
| | SUBSTRACTOR CIRCUIT | INPUT | $V_i$ | 0 | ↓ | 1 | ↓ | 1 | ↓ | 0 | 1 | 1 | ↓ | ↓ |
| | | OUTPUT | $R_i$ | 0 | ↓ | 1 | ↓ | 0 | ↓ | 1 | 1 | 0 | ↓ | ↓ |
| | OUTPUT | A-OUT | | | 0 | 1 | 1 | 0 | 1 | 1 | 1 | 0 | 0 | 1 | $S_A$ |
| | | B-OUT | | | 0 | 0 | 1 | 1 | 1 | 0 | 0 | 1 | 0 | 1 | $S_B$ |

TABLE 4
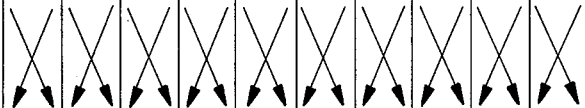

CODE CONVERTER

BACKGROUND OF THE INVENTION

The present invention relates to a code converter circuit for digital signal transmission, and more particularly to a code converter circuit to be used for transmitting binary digital signals (hereinafter referred to merely as "digital signals") respectively through a pair of transmission paths having ambiguity. The term "ambiguity" is intended to mean that the terminal-to-terminal correspondence between the input and output sides of the paired transmission paths has the possibility of being reversed.

In case that two digital signals are transmitted through the paired parallel transmission paths having ambiguity, sometimes it is convenient that even if these transmission paths were to be equivalently interchanged the signals on the transmitter side could be reproduced on the receiver side without being interchanged. More particularly, it is desirable in the paired transmission paths having a pair of input terminals and a pair of output terminals that the signals applied to the respective input terminals can appear correctly at the corresponding output terminals, regardless of whether the input terminals are connected to the corresponding output terminals, respectively, that is, directly connected or the input terminals are connected respectively to the different output terminals in a crossed relation.

In order to realize this, it has been the practice to identify the ambiguity of the paired transmission paths from received signals, with the transmission paths crossed again on the receiver side, if necessary. Conventional methods for identifying at the receiving end the input terminals to which the respective digital signals are applied are exemplified as follows:

(1) On the transmitter side a pilot code signal is inserted into the digital signals, and on the receiver side the incoming pilot code signal is detected.

(2) On the transmitter side at first a test pattern signal is transmitted prior to transmission of main signals, and on the receiver side the received test pattern signal is detected. However, in the case (1) above there is a disadvantage that a device for speed conversion of transmission signals becomes complex. Also, in the case (2) above there is a disadvantage that main signals cannot be transmitted during the period when the test pattern signal is being transmitted. In addition, in case that the ambiguity of transmission paths is caused by accident, the maintenance of the transmission paths involves large amount of manpower and also the reliability is deteriorated.

SUMMARY OF THE INVENTION

One object of the present invention is therefore to provide a code converter circuit, in which for the purpose of eliminating these disadvantages, the transmission with high quality and high reliability of two parallel digital signals is made possible by providing an encoder and a decoder on the input side and on the output side, respectively, of transmission paths having ambiguity.

According to one feature of the present invention, there is provided a code converter circuit in a digital transmission system in which two digital signals synchronized with each other are transmitted through paired transmission paths, respectively, characterized in that on the input side of said transmission paths is provided an encoder including a first detector for comparing and detecting the codes of the two signals in the same time slot among the digital signals to the transmitted, a modulo-2 adder circuit which takes a sum of said digital signals to be transmitted in response to an output of said first detector, and switching means responsive to the output of said first detector for selectively switching said digital signals to be transmitted or output signals of said adder circuit to send out digital signals through said transmission paths, and in that on the output side of said transmission paths is provided a decoder including a second detector for comparing and detecting the codes of the two signals in the same time slot among the digital signals transmitted through said transmission paths, a modulo-2 subtractor circuit which takes a difference between said digital signals transmitted through said transmission paths in response to an output of said second detector, and switching means responsive to the output of said second detector for selectively switching said digital signals transmitted through said transmission paths or output signals of said subtractor circuit to reproduce said transmitted digital signals.

BRIEF DESCRIPTION OF THE DRAWINGS

Now the present invention will be described in more detail with reference to the accompanying drawings, in which.

DESCRIPTION OF THE PREFERRED EMBODIMENT

Figure 1:
FIG. 1 is a representation of the modes of input and output signals through a pair of transmission paths having ambiguity.

Referring now to the drawings, FIG. 1 shows in block form the modes in which digital signals $S_A$ and $S_B$ applied respectively to input terminals A·IN and B·IN of transmission paths 1 having ambiguity are passed through the transmission paths 1 (consisting of two transmission paths) and then appear at output terminals A·OUT and B·OUT. Representing these modes by truth values of the input and output signals, Tables 1 and 2 are obtained. If the mode is as shown in Table 1, then it means that the input digital signals $S_A$ and $S_B$ applied to the input terminals A·IN and B·IN have been correctly reproduced at the output terminals A·OUT and B·OUT.

On the other hand, Table 2 corresponds to the case where the transmission paths 1 are interchanged in the midway, so that the input signals $S_A$ and $S_B$ at the input terminals A·IN and B·IN, respectively, appear at the output terminals B·OUT and A·OUT, respectively, and thus the input signals cannot be reproduced correctly. However, as will be obvious in Tables 1 and 2, when the input signals A·IN and B·IN in the same time slot are the same code, the input signals can be correctly reproduced even after the transmission through the paired transmission paths having ambiguity. On the other hand, appearance of the input signals $S_A$ and $S_B$ at the output terminals as interchanged, would arise only when the two input signals $S_A$ and $S_B$ in the same time slot are different codes. Accordingly, if an assembler cannot distinguish between the input terminals A·IN and B·IN or the output terminals A·OUT and B·OUT upon assembling the transmission paths 1, it is not recognized whether the assembled transmission path have been correctly connected or not. That is, the transmission paths have an ambiguity.

Here, representing the input signals A·IN and B·IN appearing in the $i$-th time slot by $(S_A, S_B)_i$, if the following representation is employed:

$$\left. \begin{array}{ll} (S_A, S_B)_i & \to S_i \\ (0, 1) & \to 0 \\ (1, 0) & \to 1 \end{array} \right\} \quad (1)$$

then signals $V_i$ which appear after signals $U_i$ (to be described hereinafter) have passed through two transmission paths having ambiguity, would be represented by $$V_i = U_i \oplus 0 \quad (2)$$

in case that the input and output of the transmission paths are directly connected, while it would be represented by $$V_i = U_i \oplus 1 \quad (3)$$

in case that the input and output of the transmission paths are connected in a crossed relation. Here it is to be noted that the symbol $\oplus$ implies an exclusive logical sum. Accordingly, in case that the states of the transmission paths are represented by either Equation-(2) or Equation-(3), also the following equation is valid:

$$V_i - V_{i-1} = U_i - U_{i-1} \quad (4)$$

where $U_{i-1}$ and $V_{i-1}$ represent input and output signals, respectively, in the ($i$-1)th time slot.

This proves that ambiguity of transmission paths can be eliminated by performing the well-known differential conversion with respect to Si.

Figure 2:
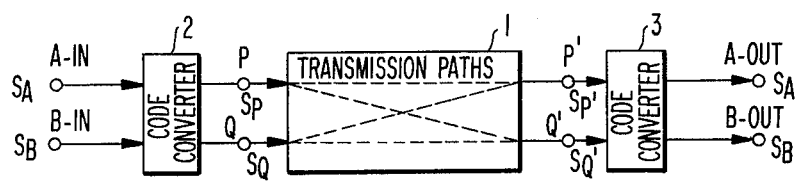
FIG. 2 is a block diagram in which an encoder and a decoder are added to the input side and the output side, respectively, of the transmission paths having ambiguity as shown in FIG. 1.

FIG. 2 shows in block form the mode of eliminating the ambiguity of the transmission paths by providing an encoder 2 and a decoder 3 on the input and output sides of the transmission paths 1 shown in FIG. 1. More detailed block diagrams of the encoder 2 and the decoder 3 are shown in FIGS. 3 and 4, respectively.

Figure 3:
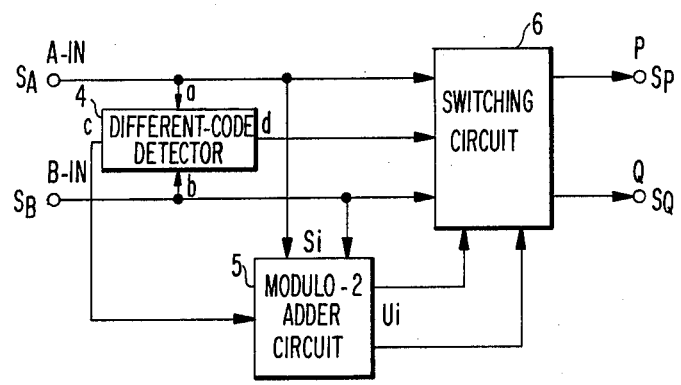
FIG. 3 is a block diagram showing an encoder in a code converter circuit according to the present invention.
Figure 4:
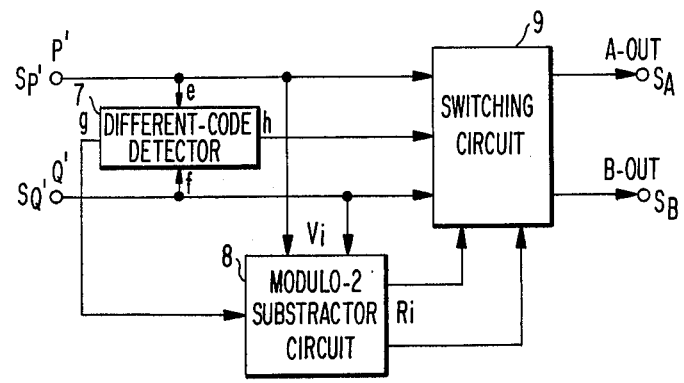
FIG. 4 is a block diagram showing a decoder in a code converter circuit according to the present invention.

In FIG. 3, reference numeral 4 designates a different-code detector; numeral 5, a modulo-2 adder circuit; and numeral 6, a switching circuit responsive to a control signal applied from the different-code detector 4. In FIG. 4, reference numeral 7 designates a different-code detector; numeral 8, modulo-2 subtractor circuit; and numeral 9, a switching circuit responsive to a control signal applied from the different-code detector 7.

In the encoder shown in FIG. 3, the different-code detector 4 detects whether the two parallel digital input signals $S_A$ and $S_B$ are the same codes or different codes in the same time slot, and if they are the same codes, then the detector 4 controls the switching circuit 6 so that the input signals may not be subjected to any encoding in said time slot. On the other hand, if they are different codes, the input signals are subjected to code conversion represented by Equation-(1), then applied to a modulo-2 adder circuit 5, and the output of the adder circuit 5 is converted as represented by Equation-(5).

$$\left. \begin{array}{l} U_i \to (S_P, S_Q)_i \\ 0 \to (0, 1) \\ 1 \to (1, 0) \end{array} \right\} \quad (5)$$

The switching circuit 6 is controlled so that these coded signals may appear at its outputs in the same time slot as that in which the different-code signals in the input signals were contained. In the modulo-2 adder circuit 5, if the input is represented by $S_i$ and the output by $U_i$, then the following equation is obtained:

$$U_i = U_{i-1} + S_i$$

that is,
$$S_i = U_i - U_{i-1}$$

Next, in the decoder shown in FIG. 4, the different-code detector 7 detects whether the parallel input signals $S_P'$ and $S_Q'$ at the input terminals P' and Q' are the same codes or different codes in the same time slot, and if they are the same codes, then the detector 7 controls the switching circuit 9 so that the input signals may not be subjected to any decoding in said time slot, and thereby output signals appear at the output terminals A·OUT and B·OUT. On the other hand, if they are different codes, the input signals are subjected to code conversion opposite to that represented by Equation-(5), then applied to a modulo-2 subtractor circuit 8, and the output of the circuit 8 is subjected to code conversion opposite to that represented by Equation-(1), and then appears at its outputs in the same time slot as that in which the different-code signals were contained.

In the modulo-2 subtractor circuit 8, if the input is represented by $V_i$ and the output by $R_i$, then the following equation is obtained:

$$R_i = V_i - V_{i-1} \quad (7)$$

Accordingly, combining Equations-(7), -(4) and (6), we obtain,
$$R_i = U_i - U_{i-1} = S_i \quad (8)$$

Operations of the above-described encoder and decoder are shown in Table 3 and Table 4. Table-3 shows logical operations in the case where the inputs and outputs are directly connected in the transmission paths while Table 4 shows logical operations in the case where the inputs and outputs are connected in a crossed relation in the transmission paths. Here it is to be noted that in the well-known differential conversion, there exists a possibility that at most the first 2 bits of reproduced codes may be erroneous depending upon the initial value, but the third and subsequent bits of codes can be correctly reproduced. In Tables 3 and 4, the initial values in the adder circuit and the subtractor circuit are assumed to be both 0.

With reference to Table 3, at a time point $t = 1$, since the parallel input signals ($S_A$, $S_B$) applied to the input terminals (A·IN, B·IN) of the encoder 2 are (0, 0), the signals (0, 0) are emitted at the output terminals (A·OUT, B·OUT). These output signals pass through the directly connected transmission paths, and the signals are applied to the input terminals (P', Q') of the decoder 3. The signals ($S_{P'}$, $S_{Q'}$) = (0, 0) applied to the decoder, are emitted at the output terminals (A·OUT, B·OUT) of the decoder. At a time point $t = 2$, since signals ($S_A$, $S_B$) = (1, 0) appear at the input terminals (A·IN, B·IN), the detector 4 responds thereto, and in the adder circuit 5 a sum of an output signal $U_i = U_0$ at the time point $t = 1$, that is, 0 and an input signal $S_2$ at $t = 2$, that is, 1 is taken, so that an output signal $U_2$ at $t = 2$ becomes $0 + 1 = 1$. In other words, outputs ($S_P$, $S_Q$) of the encoder becomes (1, 0) with reference to Equation-(5). Also in the decoder, since the input signals are ($S_{P'}$, $S_{Q'}$) = (1, 0), the detector 7 responds thereto, and in the subtractor circuit 8 a difference between an input signal $V_2$ at $t = 2$, that is, 1 and an input signal $V_1 = V_0$ at $t = 1$, that is, 0 is taken according to Equation-(7), so that an output signal at $t = 2$ becomes $1 - 0 = 1$. Accordingly, the signals at the output terminals (A·OUT, B·OUT) of the decoder become (1, 0). At $t = 3$ and thereafter also, similar operations to that described above are carried out, and thus Table 3 is obtained. In other words, the signals ($S_A$, $S_B$) applied to the input terminals (A·IN, B·IN) appear, after passing through the transmission paths, at the output terminals (A·OUT, B·OUT) as unchanged signals ($S_A$, $S_B$).

Logical operations of the coder in Table 4 are identical to those shown in Table 3, but logical operations of the decoder after passing through the crossed transmission paths are different from those shown in Table 3. Therefore, description will be made hereunder with respect to the decoder only.

At $t = 1$, the input signals ($S_{P'}$, $S_{Q'}$) = (0, 0) of the decoder 3 appear at the output terminals (A·OUT, B·OUT). At $t = 2$, since the input signals are ($S_{P'}$, $S_{Q'}$) = (0, 1), the detector 7 responds thereto, and in the subtractor circuit 8 a difference between the signals $V_1 = V_0 = 0$ and $V_2 = 0$ is taken, so that the output $R_2$ becomes 0, and signals (0, 1) appear at the output terminals (A·OUT, B·OUT). At $t = 3$, the input signals ($S_{P'}$, $S_{Q'}$) = (1, 1) appear at the outputs. At $t = 4$, in the subtractor circuit 8 a difference between the signals $V_3 = V_2 = 0$ and $V_4$ is taken, so that an output $R_4 = 0$ is obtained, and the output signals become (0, 1). Subsequently, on the basis of similar operations Table 4 is obtained. In this Table 4, it will be seen that after $t = 3$, the input signals ($S_A$, $S_B$) applied to the input terminals (A·IN, B·IN) appear at the output terminals (A·OUT, B·OUT). In other words, regardless of the fact that the transmission paths are crossed, the input signals would appear at the output terminals without being interchanged.

Figure 5:
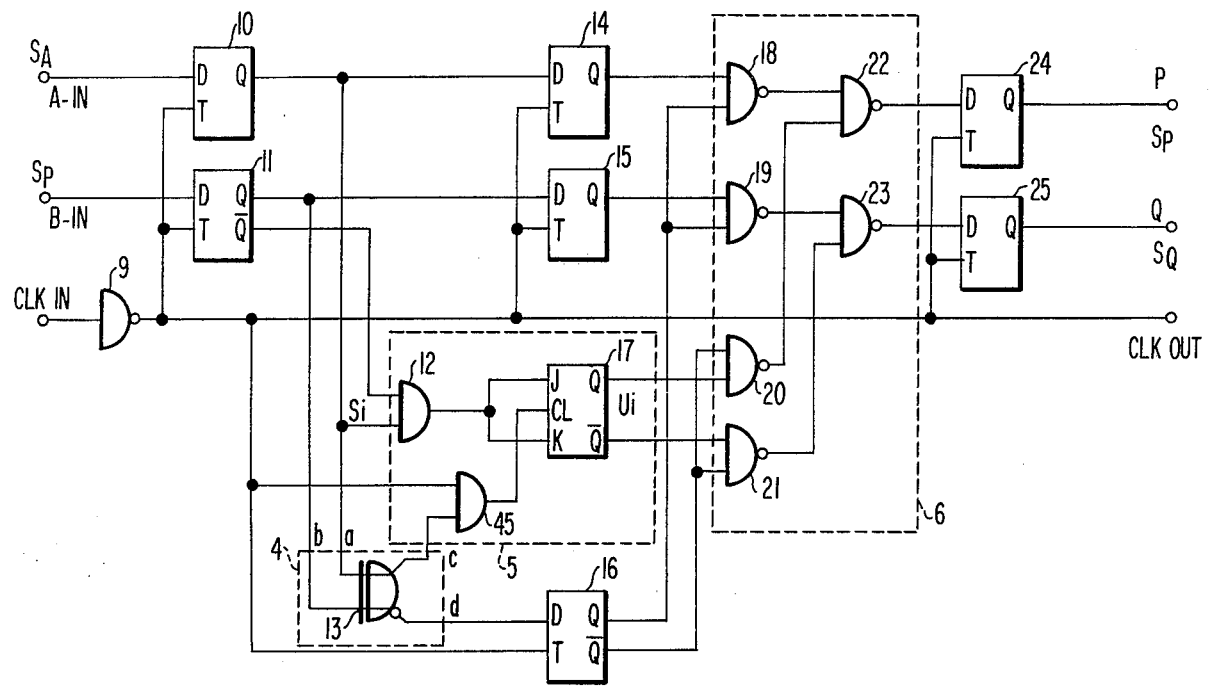
FIG. 5 shows one example of a detailed circuit of the encoder in FIG. 3.

In FIG. 5 is shown one example of a detailed circuit of the encoder shown in FIG. 3. In this figure, reference numerals 9 and 18 to 23 designate NAND circuits; numerals 10, 11, 14 to 16, 24 and 25, edge-triggered flip-flop circuits; numeral 13, an exclusive OR circuit; numerals 12 and 45, AND circuits; and numeral 17, a J·K master-slave flip-flop. Reference numerals 10, 11 and 24, 25 designate flip-flops for shaping the input and output waveforms, respectively. The detector 4 consisting of the exclusive OR circuit 13 emits 1 at its output, only when its input signals are different codes. A modulo-2 adder circuit 5 is driven by this output. This adder circuit 5 is composed of the AND circuits 12 and 45 and the J·K master-slave flip-flop 17. This circuit 5 carries out the conversion represented by Equation-(1) for the input signals, performs adding operations of modulo-2, and applies the conversion represented by Equation-(5) to the output signals. The edge-triggered flip-flop circuits 14 to 16 are used as delay elements having the same delay as the delay time of said adder circuit 5. The switching circuit 6 is composed of the NAND circuits 18 to 23 only, and only when the input signals are different codes, it emits the output $U_i$ of the adder circuit 5 at the terminals P and Q in response to the output signal $d$ of the detector 4, but in the case where the input signals are the same codes, it emits the input signals $S_A$ and $S_B$ at the terminals P and Q. To a terminal CLK·IN is applied a clock signal for driving the flip-flops.

Figure 6:
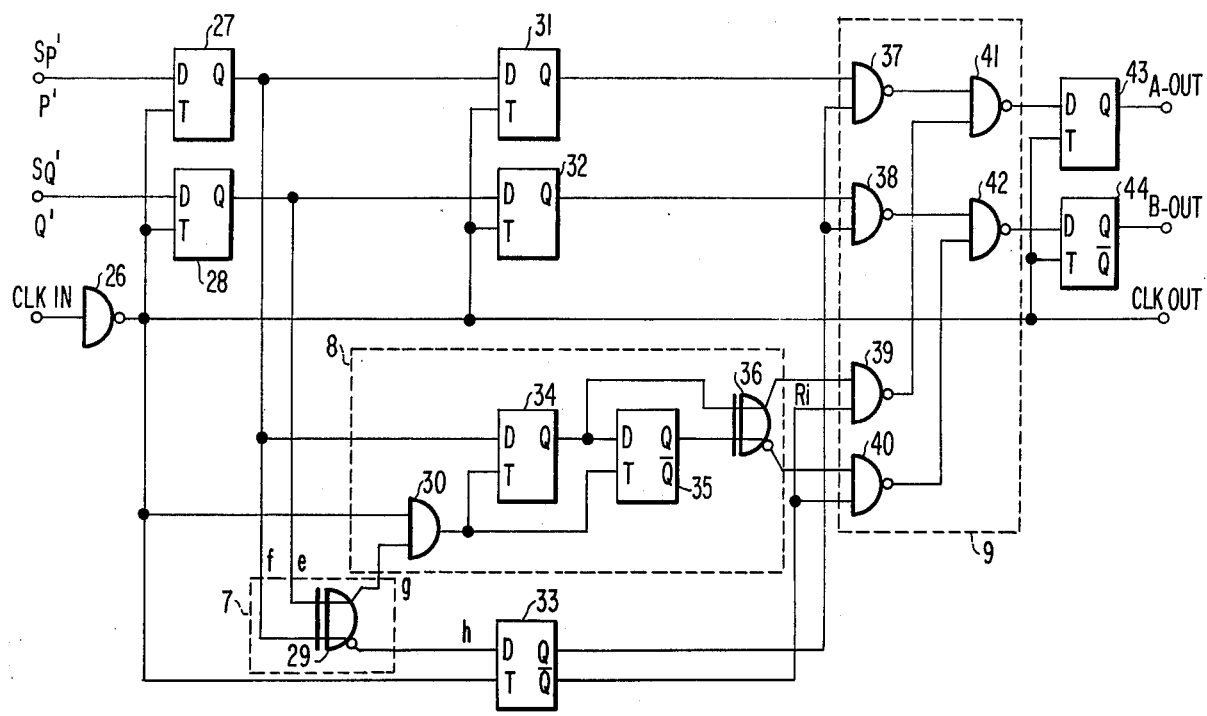
FIG. 6 shows one example of a detailed circuit of the decoder in FIG. 4, Tables 1 and 2 are truth tables for input and output signals in case that two digital signals are passed through transmission paths having ambiguity, Table 3 shows logical operation states at various portions in the code converter circuit in case that two transmission path are directly connected, and Table 4 shows logical operation states at various portions in the code converter circuit in case that two transmission path are connected in a crossed relation.

In FIG. 6 is shown one example of a detailed circuit of the decoder in FIG. 4. In this figure, reference numerals 26 and 37 to 42 designate NAND circuits, numeral 10 designates an AND circuit, numerals 27, 28, 31 to 35, 43 and 45 designate edge-triggered flip-flops, and numerals 29 and 36 designate exclusive OR circuits. The edge-triggered flip-flops 27, 28 and 43, 44 are flip-flops for shaping the input and output waveforms, respectively. The detector 7 consisting of the exclusive OR circuit 29 only emits 1 at its output, only when its input signals are different codes. A modulo-2 subtractor circuit 8 is driven by this output. This subtraction circuit 8 is composed of the AND circuit 30, the flip-flops 34 and 35, and the exclusive OR circuit 36. This circuit 8 carries out a conversion opposite to that represented by Equation-(5) for the input signals, performs subtracting operations of modulo-2, and applies a conversion opposite to that represented by Equation-(1) to the output signals. The edge-triggered flip-flops 31 to 33 are used as delay elements having the same delay as the delay time of said subtractor circuit 8. The switching circuit 9 performs the same operation as said switching circuit 6.

While one preferred embodiment of the present invention has been described above and illustrated in FIGS. 3 to 6, it is intended that the invention should not be limited to this particular embodiment.

As fully described in the above specification, the code converter system according to the present invention makes it possible to realize digital signal transmission of extremely high quality and high reliability.

What is claimed is:

1. In a digital transmission system in which two mutually-synchronized digital signals are transmitted through a pair of transmission paths, respectively, wherein the terminal-to-terminal correspondence between input and output side of said transmission paths has the possibility of being reversed, the improvement comprising a code converter circuit wherein said code converter circuit comprises:

a. an encoder having a pair of input terminals and a pair of output terminals connected to the input side of said transmission paths, said encoder including
      i. a first detector connected to the pair of input terminals of said encoder for comparing and detecting the codes of the two signals in the same time slot among the digital signals to be transmitted, ii. a modulo-2 adder circuit connected to the pair of input terminals of said encoder and responsive to an output of said first detector for developing a sum of said digital signals to be transmitted, and iii. first switching means connected to the pair of input terminals of said encoder and to said modulo-2 adder for selecting said digital signals to be transmitted or output signals of said modulo-2 adder circuit depending on the output of said first detector to send out digital signals through said pair of transmission paths; and b. a decoder having a pair of output terminals and a pair of input terminals connected to the output side of said transmission paths, said decoder including i. a second detector connected to the pair of input terminals of said decoder for comparing and detecting the codes of the two signals in the same time slot among the digital signals transmitted through said pair of transmission paths, ii. a modulo-2 subtractor circuit connected to the pair of input terminals of said decoder and responsive to the output of said second detector for developing a difference between said digital signals transmitted through said transmission paths, and iii. second switching means connected to the pair of input terminals of said decoder and to output terminals of said modulo-2 subtractor for selecting said digital signals transmitted through said transmission paths or output signals of said modulo-2 subtractor circuit depending on the output of said second detector to reproduce the transmitted digital signals at the output terminals of said decoder.

2. The code converter circuit are recited in claim 1 wherein said first and second detectors are exclusive OR circuits.

3. The code converter circuit as recited in claim 1 wherein said encoder further comprises:

first and second edge-triggered flip-flops connected to receive respective ones of said two mutually-synchronized digital signals and generate true and complementary outputs, said first detector being connected to receive the true outputs of said first and second flip-flops and said modulo-2 adder circuit being connected to receive the true output of said first flip-flop and the complementary output of said flip-flop, and delay means connected between said first and second flip-flops and said first switching circuit and between said first detector and said first switching circuit, said delay means having the same delay time as said modulo-2 adder circuit.

4. The code converter circuit as recited in claim 3 wherein said modulo-2 adder circuit comprises:

an AND circuit receiving as inputs said true output of said first flip-flop and said complementary output of said second flip-flop, and a master-slave flip-flop having both inputs connected to the output of said AND gate and triggered by the output of said first detector.

5. The code converter circuit as recited in claim 4 wherein said first detector is an exclusive OR circuit.

6. The code converter circuit as recited in claim 1 wherein said decoder further comprises:

third and fourth edge-triggered flip-flops connected to receive respective ones of said digital signals transmitted through said pair of transmission paths and generate true outputs, said second detector being connected to receive the true outputs of said third and fourth flip-flops and said modulo-2 subtractor circuit being connected to receive the true output of said third flip-flop, and delay means connected between said third and fourth flip-flops and said second switching circuit and between said second detector and said second switching circuit, said delay means having the same delay time as said modulo-2 subtractor circuit.

7. The code converter circuit as recited in claim 6 wherein said modulo-2 subtractor circuit comprises:

fifth and sixth edge-triggered flip-flops each triggered by the output of said second detector and generating true outputs, the input to said fifth flip-flop being connected to the true output of said third flip-flop and the input to said sixth flip-flop being connected to the true output of said fifth flip-flop, and an exclusive OR circuit connected to receive the true outputs of said fifth and sixth flip-flops.

8. The code converter circuit as recited in claim 7 wherein said second detector is an exclusive OR circuit.

* * * * *

UNITED STATES PATENT OFFICE

CERTIFICATE OF CORRECTION

Patent No. 4,081,790                    Dated    March 28, 1978

Inventor(s) Masami YAMAMOTO, Fumiaki YAMAZAKI, Akira HOSODA, Hiromi HASHIMOTO, and Yoichi TAN It is certified that error appears in the above-identified patent and that said Letters Patent are hereby corrected as shown below:

IN THE SPECIFICATION:

Column 2, line 3  - delete "the" insert -- be -- line 50 - delete "path" insert -- paths -- line 53 - delete "path" insert --paths --

Column 4, line 33 - delete "$S_p{'}$" insert -- $S_{P'}$ -- line 33 - delete "$S_Q{'}$" insert -- $S_{Q'}$ --

Column 5, line 10 - delete "$(S_p{'}, S_Q{'})$" insert -- $(S_{P'}, S_{Q'})$ -- line 18 - delete "$S_p$" insert -- $S_P$ -- line 20 - delete "$(S_p{'}, S_Q{'})$" insert -- $(S_{P'}, S_{Q'})$ --

UNITED STATES PATENT OFFICE

CERTIFICATE OF CORRECTION

Patent No. 4,081,790          Dated March 28, 1978

Inventor(s) Masami YAMAMOTO, Fumiaki YAMAZAKI, Akira HOSODA, Hiromi HASHIMOTO, and Yoichi TAN It is certified that error appears in the above-identified patent and that said Letters Patent are hereby corrected as shown below:

Page Two--

Column 5, line 40 - delete "$(S_p{'}, S_Q{'})$" insert -- $(S_{P_1}, S_{Q_1})$ -- line 42 -    "        "        "        "

line 47 -    "        "        "        "

IN THE CLAIMS:

Column 7, line 35 - delete "are" insert -- as --

Column 8, line 2 - after "said" insert -- second --

Signed and Sealed this

Nineteenth Day of September 1978

[SEAL]

Attest:

RUTH C. MASON
Attesting Officer

DONALD W. BANNER
Commissioner of Patents and Trademarks